(12) United States Patent
Yazdanparast et al.

(10) Patent No.: US 12,438,630 B2
(45) Date of Patent: Oct. 7, 2025

(54) SIGNAL TO INTERFERENCE AND NOISE RATIO ESTIMATION

(71) Applicant: Cisco Technology, Inc., San Jose, CA (US)

(72) Inventors: Audrey Yazdanparast, Richfield, OH (US); Brian D. Hart, Sunnyvale, CA (US)

(73) Assignee: Cisco Technology, Inc.

( * ) Notice: Subject to any disclaimer, the term of this patent is extended or adjusted under 35 U.S.C. 154(b) by 423 days.

(21) Appl. No.: 18/168,754

(22) Filed: Feb. 14, 2023

(65) Prior Publication Data

US 2024/0275505 A1    Aug. 15, 2024

(51) Int. Cl.
*H04B 17/336*    (2015.01)
(52) U.S. Cl.
CPC .................. *H04B 17/336* (2015.01)
(58) Field of Classification Search
CPC ..................................................... H04B 17/336
See application file for complete search history.

(56) References Cited

U.S. PATENT DOCUMENTS

| | | |
|---|---|---|
| 2005/0152480 A1 | 7/2005 | Chang et al. |
| 2008/0317178 A1* | 12/2008 | Kim ............... H04B 7/0669 |
| | | 375/347 |
| 2014/0362935 A1 | 12/2014 | Porat et al. |
| 2018/0278308 A1 | 9/2018 | Jin et al. |
| 2019/0123844 A1 | 4/2019 | Yun |
| 2022/0255582 A1 | 8/2022 | Ibrahim et al. |
| 2024/0275505 A1* | 8/2024 | Yazdanparast ....... H04B 17/336 |

* cited by examiner

*Primary Examiner* — Zhiren Qin
(74) *Attorney, Agent, or Firm* — Merchant & Gould P.C.

(57) ABSTRACT

Signal to Interference and Noise Ratio (SINR) estimation, and more specifically providing SINR estimation during Legacy Long Training Field (LLTF) accounting for Inter Symbol Interference (ISI) may be provided. SINR estimation may include receiving a Physical Layer Protocol Data Unit (PPDU) including a LLTF and extracting groups of transmission symbols from the LLTF. Next, groups of fragmented symbols may the groups of transmission symbols. One or more Sum of the Squared Magnitudes (SSM) may be determined, such as an SSM of the total signal, an SSM of the signal without ISI and/or noise, an SSM of ISI, an SSM of noise. Finally, SINR may be estimated using one or more SSMs (e.g., the SSM of noise, the SSM of signal, and the SSM of ISI).

20 Claims, 6 Drawing Sheets

SIGNAL TO INTERFERENCE AND NOISE RATIO ESTIMATION

TECHNICAL FIELD

The present disclosure relates generally to providing Signal to Interference and Noise Ratio (SINR) estimation, and more specifically providing SINR estimation during Legacy Long Training Field (LLTF) accounting for Inter Symbol Interference (ISI).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Signal to Interference and Noise Ratio (SINR) estimation, and more specifically providing SINR estimation during Legacy Long Training Field (LLTF) accounting for Inter Symbol Interference (ISI) may be provided. SINR estimation may include receiving a Physical Layer Protocol Data Unit (PPDU) including a LLTF and extracting groups of transmission symbols from the LLTF. Next, groups of fragmented symbols may be constructed from the groups of transmission symbols. One or more Sum of the Squared Magnitudes (SSM) may be determined, such as an SSM of the total signal, an SSM of the signal without ISI and/or noise, an SSM of ISI, an SSM of noise. Finally, SINR may be estimated using the one or more SSMs (e.g., the SSM of noise, the SSM of signal, and the SSM of ISI).

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Estimation of Signal to Interference and Noise Ratio (SINR) is vital for Wi-Fi systems. The estimated SINR may have multiple applications in Wi-Fi processing, including for Minimum Mean Square Error (MMSE) channel estimation, channel interpolation and smoothing, and soft Binary Convolution Code (BCC) and/or Low Density Parity Check (LDPC) tone de-mapping for example. However, many existing approaches to estimate SINR fail to account for Inter Symbol Interference (ISI). For example, ISI contribution from an Orthogonal Frequency-Division Multiplexing (OFDM) symbol may smear or otherwise overlap onto the next OFDM symbol, causing the next OFDM symbol to suffer from interference. This can be a problem for the Data Field, but the same dispersion may affect all OFDM symbols in the whole Physical Layer Protocol Data Unit (PPDU). Similar effects can also be observed at the Legacy Short Training Field (LSTF)/Legacy Long Training Field (LLTF) and LLTF/Legacy Signal Field (LSIG) boundaries.

Moreover, recent Wi-Fi generations such as Wi-Fi 6 (i.e., the Institute of Electrical and Electronics Engineers (IEEE) 802.11ax standard or High Efficiency (HE) format) and Wi-Fi 7 (IEEE 802.11be or Extremely High Throughput (EHT) format) may define short guard intervals (GI) for the Data Field (e.g., see Table 27-12 at IEEE802.11ax D6.0 and Table 36-18 at IEEE802.11be D1.0). Exploiting short GIs may improve system throughput; however, it may increase the possibility of ISI within the Data Field which may lead to performance degradation if it is ignored. Therefore, it can be vital for Wi-Fi systems exploiting short GI to estimate the correct SINR in order to minimize the impact of ISI within the Data field.

Figure 1:
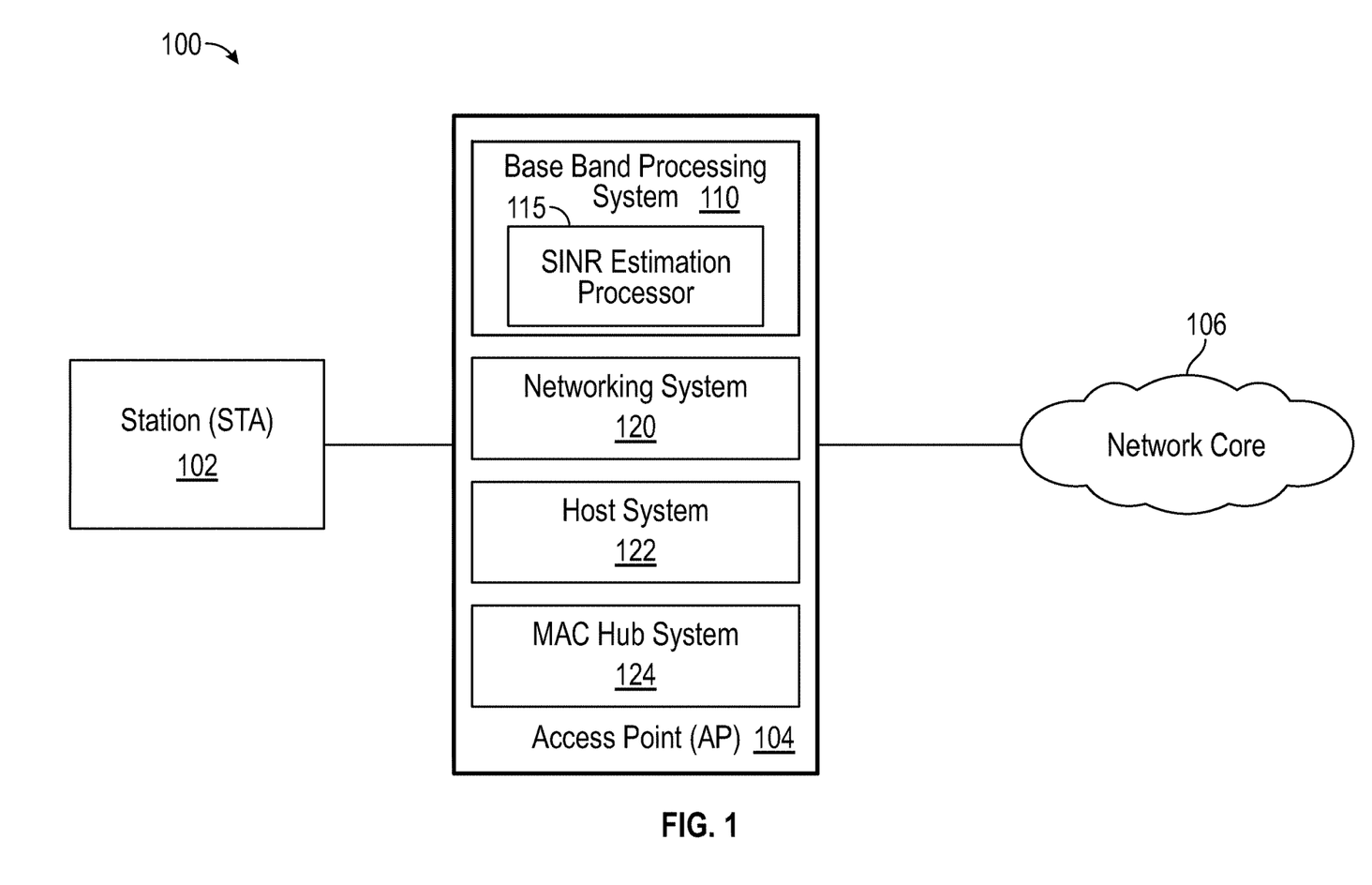
FIG. 1 is a block diagram of an operating environment for estimating Signal to Interference and Noise Ratio (SINR)

FIG. 1 is a block diagram of an operating environment 100 for estimating SINR. The operating environment 100 includes a Station (STA) 102, an Access Point (AP) 104, and a network core 106. The STA 102 may be a device (e.g., a laptop, a desktop personal computer, a smart phone, a server, etc.) that is capable of communicating with the AP 104 or otherwise access the network core 106. The AP 104 may facilitate a connection between the STA 102 and the network core 106. The network core 106 may provide services to devices that communicate and otherwise connect to the network core 106.

The AP 104 may include a base band signal processing system 110, a networking system 120, a host system 122, and a Media Access Control (MAC) hub system 124. The networking system 120 may control a networking system (e.g., for ethernet) to facilitate communication between the STA 102 and the network core 106. The host system 122 may control the management of the AP 104 (e.g., connections to STAs such as the STA 102, communications with the network core 106, and/or the like). The MAC hub system 124 may determine when transmissions occur.

The base band signal processing system 110 can receive data (e.g., from the STA 102) and may convert data into radio frequency signals (and vice-versa) to be transmitted over a Radio Area Network (RAN). The base band signal processing system 110 includes a SINR estimation processor 115 in this example. In other examples, the SINR estimation processor 115 may be its own system, a system on the AP 104, a system on another device, and/or part of one of the other systems of the AP 104. The SINR estimation processor 115 may use received PPDUs to estimate SINR, including accounting for ISI for example. The SINR estimation processor 115 may use the LLTF of a PPDU to estimate SINR and account for ISI. The SINR estimation processor's 115 SINR estimation process will be explained in more detail herein. SINR may be measured in decibels (dB).

The SINR estimation processor 115 may evaluate a received PPDU that includes a LLTF to estimate SINR. The AP 104 may receive the PPDU from the STA 102 or the network core 106.

Figure 2:
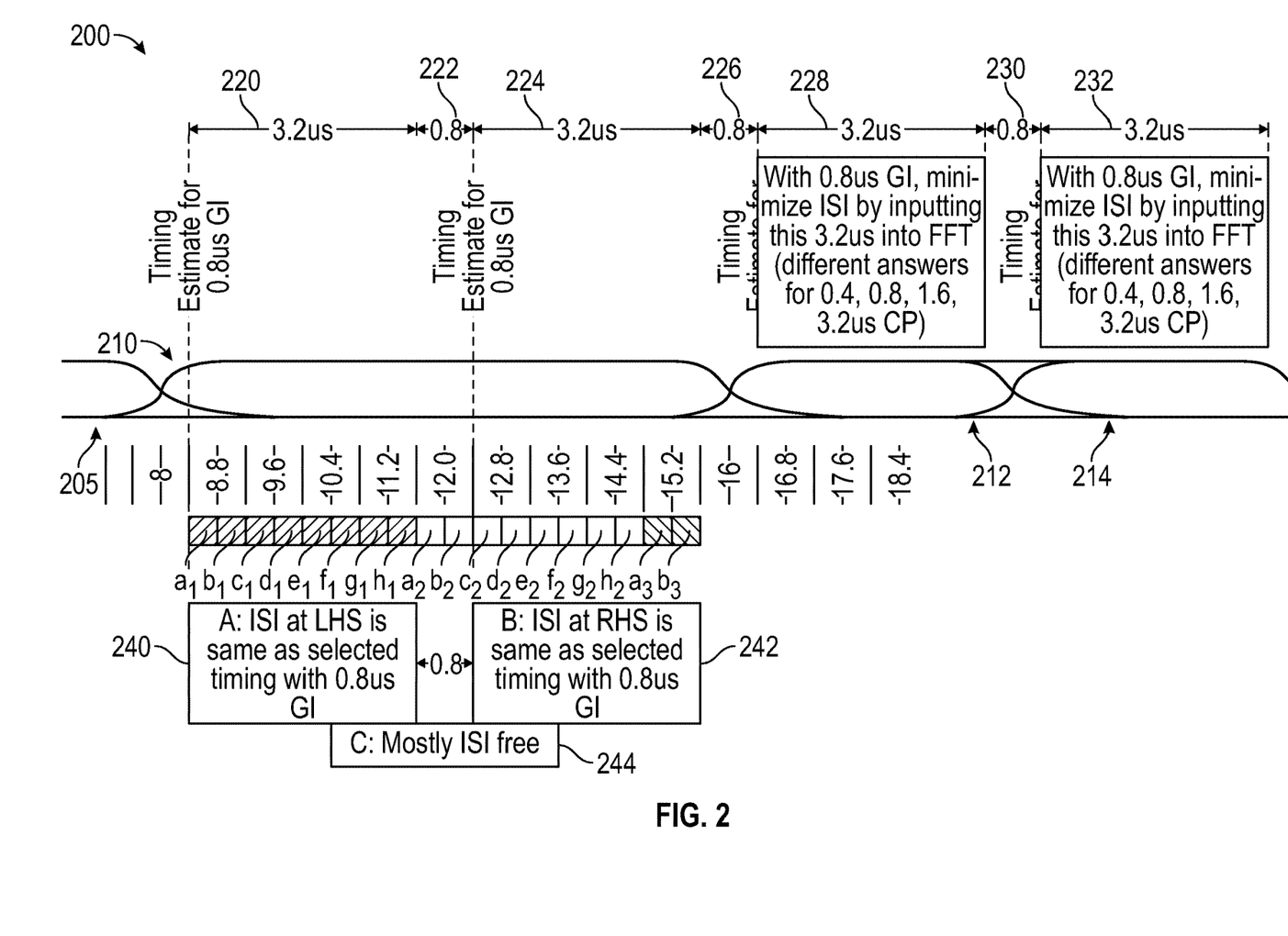
FIG. 2 is a diagram of a signal used for estimating SINR.

FIG. 2 is a diagram of a signal 200 used for estimating SINR. The signal 200 includes a Legacy Short Training Field (LSTF) 205, a LLTF 210, a LSIG 212, and a LSIG Repetition (RLSIG) 214. In some examples, the RLSIG 214 may not be included. In the illustrated example, the time for a transmission (e.g., transmission of the LSTF 205, transmission of the LLTF 210, transmission of the LSIG 212 and RLSIG 214) may be 4 or 8 microseconds (e.g., 8 microseconds to transmit the LSTF 205, 8 microseconds to transmit the LLTF 210, 4 microseconds to transmit the LSIG 212, 4 microseconds to transmit the RLSIG 214). However, the transmissions may have different transmission periods in other examples.

The LLTF 210 may include a first transmission period 220, a first guard interval 222, and a second transmission period 224. The LLTF 210 may also include another guard interval immediately before the first transmission period 220 and after the LSTF 205. The LSIG 212 may include a second guard interval 226 and a third transmission period 228. The RLSIG 214 may include a third guard interval 230 and a fourth transmission period 232. In this example, the transmission periods are 3.2 microseconds, and the guard intervals are 0.8 microseconds. However, the time for the transmission periods and the guard intervals may vary in other examples.

The SINR estimation processor 115 may determine three LLTF symbols (e.g., signals) from the LLTF 210, a first transmission symbol 240, a second transmission symbol 242, and a third transmission symbol 244. The SINR estimation processor 115 may determine the positions and/or timings or otherwise extract the first transmission symbol 240, the second transmission symbol 242, and the third transmission symbol 244. The first transmission symbol 240 may include the full transmission of the first transmission period 220. The second transmission symbol 242 may include the full transmission of the second transmission period 224. The third transmission symbol 244 may include a portion of the transmission of the first transmission period 220, the full first guard interval 222, and a portion of the transmission of the second transmission period 224. For example, the third transmission symbol 244 may include the last 1.2 microseconds of the first transmission period 220, the 0.8 microseconds of the first guard interval 222, and the first 1.2 microseconds of the second transmission period 224.

The SINR estimation processor 115 may determine fragmented LLTF symbols of the LLTF 210. For example, the SINR estimation processor 115 may determine 0.4 microsecond fragments of the LLTF 210. The first transmission symbol 240 may include fragments $a_1$, $b_1$, $c_1$, $d_1$, $e_1$, $f_1$, $g_1$, and $h_1$. The second transmission symbol 242 may include fragments $c_2$, $d_2$, $e_2$, $f_2$, $g_2$, $h_2$, $a_3$, and $b_3$. The third transmission symbol 244 may include fragments $f_1$, $g_1$, $h_1$, $a_2$, $b_2$, $c_2$, $d_2$, and $e_2$.

Figure 3:
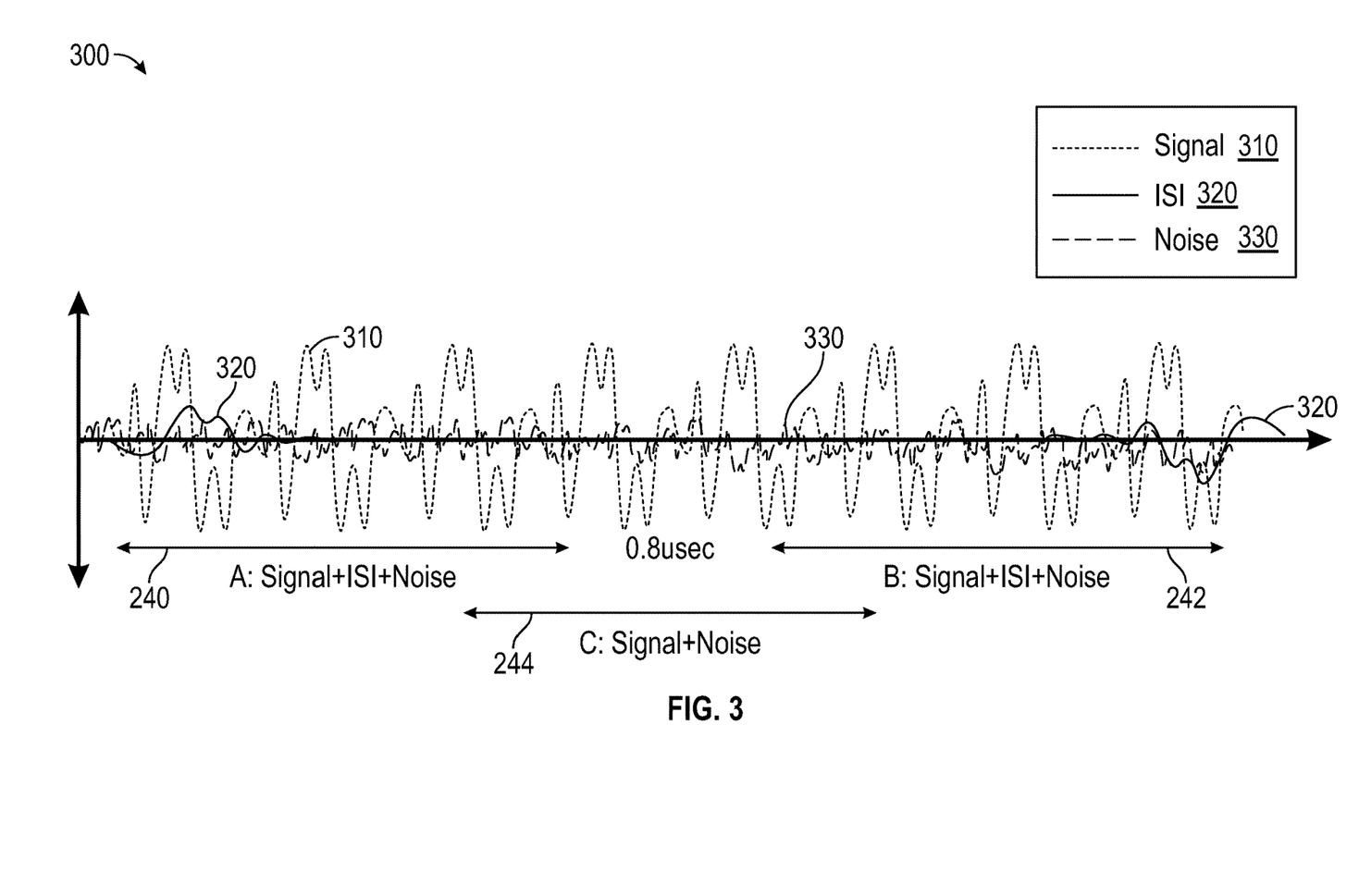
FIG. 3 is a chart of Legacy Long Training Field (LLTF) symbols, noise, and Inter Symbol Interference (ISI)

FIG. 3 is a chart 300 of LLTF symbols, noise, and ISI. The chart 300 includes the first transmission symbol 240, the second transmission symbol 242, and the third transmission symbol 244. The chart includes the signal 310 waveform, an ISI 320 waveform, and a noise 330 waveform.

Because the first transmission symbol 240 includes the beginning of the LLTF 210, the first transmission symbol 240 may include ISI 320, from a signal transmitted before the LLTF 210 for example (e.g., during $a_1$, $b_1$, and/or $c_1$). For example, the first transmission symbol 240 may include ISI 320 from the LSTF 205. Because the second transmission symbol 242 includes the end of the LLTF 210, the second transmission group may include ISI 320 from the LSIG 212 (e.g., during $a_3$ and $b_3$). Because the third transmission symbol 244 does not include the beginning or end of the LLTF 210, the third transmission symbol 244 may not include ISI 320. The first transmission symbol 240, the second transmission symbol 242, and the third transmission symbol 244 may all include the associated signal 310 and noise 330.

Figure 4:
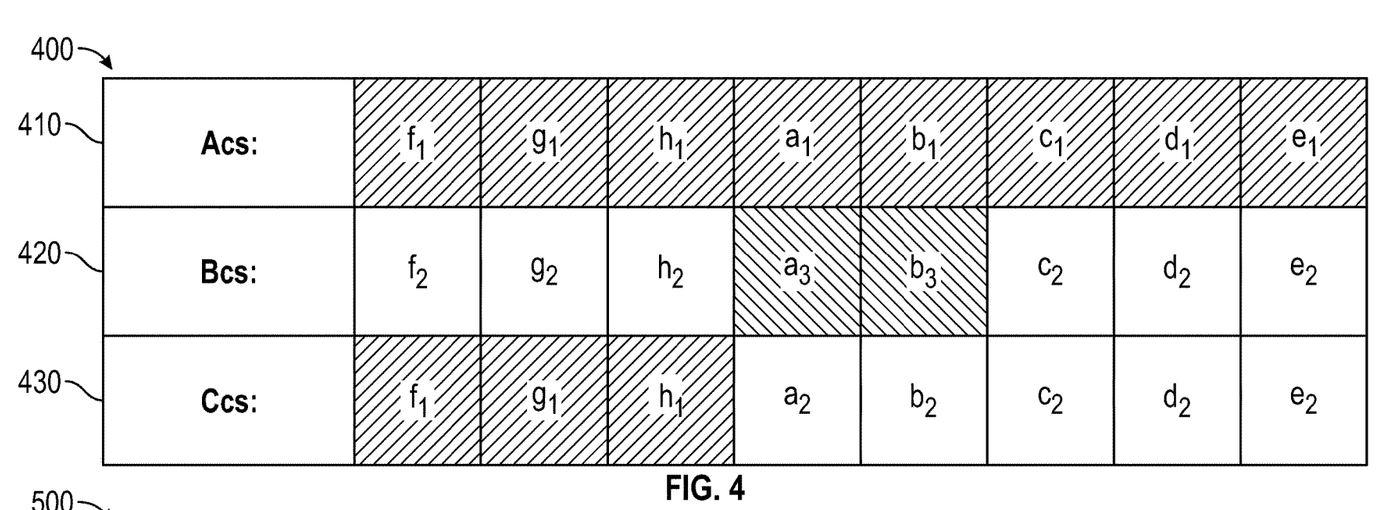
FIG. 4 is a chart of groups of fragmented LLTF symbols for estimating SINR.

FIG. 4 is a chart 400 of groups of fragmented LLTF symbols for estimating SINR. The chart 400 includes a first group of fragmented symbols 410, a second group of fragmented symbols 420, and a third group of fragmented symbols 430. The SINR estimation processor 115 may determine the first group of fragmented symbols 410, the second group of fragmented symbols 420, and the third group of fragmented symbols 430.

The first group of fragmented symbols 410 may include fragments $f_1$, $g_1$, $h_1$, $a_1$, $b_1$, $c_1$, $d_1$, and $e_1$ in that order. The SINR estimation processor 115 may shift the first transmission symbol 240 (e.g., shifting the order of the fragments) for the first group of fragmented symbols to be in the order. In this example, the SINR estimation processor 115 cyclically shifts the first transmission symbol 240 1.2 microseconds right.

The second group of fragmented symbols 420 may include fragments $f_2$, $g_2$, $h_2$, $a_3$, $b_3$, $c_2$, $d_2$, and $e_2$ in that order. The SINR estimation processor 115 may shift the second transmission symbol 242 (e.g., shift the fragments of the second transmission symbol 242) for the first group of fragmented symbols to be in the order. In this example, the SINR estimation processor 115 cyclically shifts the second transmission symbol 242 1.2 microseconds right.

The third group of fragmented symbols 430 may include $f_1$, $g_1$, $h_1$, $a_2$, $b_2$, $c_2$, $d_2$, and $e_2$ in that order, the sequence of the third transmission symbol 244. Because the third group of fragmented symbols 430 is the sequence of the third transmission symbol 244, the third group of fragmented symbols 430 may include the signal and noise but no ISI or essentially no ISI. The SINR estimation processor 115 may use the first group of fragmented symbols 410, the second group of fragmented symbols 420, and the third group of fragmented symbols 430 for estimating SINR.

The fragments $a_i$ (e.g., $a_1$, $a_2$, and $a_3$) may correspond to the same LLTF signal portion of the first transmission symbol 240, the second transmission symbol 242, and the third transmission symbol 244. Additionally, the fragments $b_i$ may correspond to the same LLTF signal portion, the fragments $c_i$ may correspond to the same LLTF signal portion, the fragments $b_i$ may correspond to the same LLTF signal portion, the fragments $d_i$ may correspond to the same LLTF signal portion, the fragments $e_i$ may correspond to the same LLTF signal portion, the fragments $f_i$ may correspond to the same LLTF signal portion, the fragments $g_i$ may correspond to the same LLTF signal portion, and the fragments $h_i$ may correspond to the same LLTF signal portion of the first transmission symbol 240, the second transmission symbol 242, and the third transmission symbol 244.

The SINR estimation processor 115 may calculate or otherwise determine the Sum of the Squared Magnitudes (SSM) of the samples and/or sample differences over a time window equal to the input to the Fast Fourier Transform (FFT), The SINR estimation processor 115 may use the SSM of the samples or sample differences to characterize signal, noise, and or ISI energy for an OFDM symbol. The SINR estimation processor 115 may calculate an SSM using equation 1 and/or equation 2. Equation 1 is shown below for some signal x for determining the SSM of a sample:

$$SSM(x) = \sum_n |x_n|^2 \qquad (1)$$

Equation 2 is shown below for some signals x and y for determining the SSM of sample difference between signals x and y:

$$SSM(x, y) = \sum_n |y_n - x_n|^2 \qquad (2)$$

The SINR estimation processor 115 may also perform the calculation in the frequency domain for alignment with other data path functions and/or when the input signal has a high sampling rate (e.g., a sampling rate of more than 20 million complex samples per second). Additionally, the SINR estimation processor 115 may perform the calculation in the frequency domain when the SINR estimation processor 115 determines to use the FFT for filtering.

In order to estimate SINR, the SINR estimation processor 115 may calculate the signal SSM ($SSM_{signal}$), the noise SSM ($SSM_{noise}$), and the ISI SSM ($SSM_{ISI}$) according to the methods and/or equations described in more detail herein. The SINR estimation processor 115 may also determine the ratio of the time windows, K, used in the Data field (12.8 us) of the PPDU and in the preamble (3.2 us) of PPDU (i.e., K=4,). The ratio, K, may equal one for the IEEE standard 802.11a/g/HT/VHT. Once the SINR estimation processor 115 calculates the $SSM_{signal}$, the $SSM_{noise}$, the $SSM_{ISI}$, and the ratio, K, the estimated SINR may be equal to the ratio of the $SSM_{signal}$ input to the FFT (i.e., an energy) over the $SSM_{noise}$ input to the FFT plus the $SSM_{ISI}$. The input to the FFT of HE/EHT symbols in the Data field may be 12.8 us rather than the 3.2 us that the SINR estimation processor 115 processes in the preamble. If the symbols increase from 3.2 us to 12.8 us, the signal and noise SSMs increase by a ratio of K=4, but the ISI is unchanged. For 11a/g/HT/VHT, K may be set to 1. Thus, the SINR estimation processor 115 may calculate the estimated SINR using equation 3 shown below:

$$SINR = \frac{K * SSM_{signal}}{K * SSM_{noise} + SSM_{ISI}} \qquad (3)$$

As discussed above, with respect to FIG. 2, FIG. 3, and FIG. 4, the third group of fragmented symbols 430 is the sequence of the third transmission symbol 244, the third group of fragmented symbols 430 may include the signal and noise but no ISI because ISI is expected at the boundaries of LLTF symbols (e.g., at the fragments $a_1$, $b_1$, $a_3$, and $b_3$). So, in order to estimate the $SSM_{signal}$, the SINR estimation processor 115 may determine the $SSM_{noise}$ and then subtract the $SSM_{noise}$ from the total SSM ($SSM_{total}$) within the third group of fragmented symbols 430.

The SINR estimation processor 115 may use the first group of fragmented symbols 410 and the second group of fragmented symbols 420 to determine the $SSM_{noise}$ because the fragmented symbols should include the same LLTF signal, thereby allowing the SINR estimation processor 115 to remove the signal waveform and keep the noise waveform. However, the SINR estimation processor 115 may exclude portions of the LLTF with ISI (e.g., portions of the first group of fragmented symbols 410 and the second group of fragmented symbols 420) when determining the $SSM_{noise}$. FGFS[$f_1$, $g_1$, $h_1$, $c_1$, $d_1$, $e_1$] may denote the first group of fragmented symbols 410 with the fragments including ISI removed (e.g., $a_1$ and $b_1$). SGFS[$f_2$, $g_2$, $h_2$, $c_2$, $d_2$, $e_2$] may denote the second group of fragmented symbols 420 with the fragments including ISI removed (e.g., $a_3$ and $b_3$). The SINR estimation processor 115 may multiply the SSM by a factor of 8/6 to extend the 2.4 microsecond period with the fragments including ISI removed to 3.2 microseconds. However, subtracting two random variables results in a random variable with power equal to the sum of each. Therefore, the SINR estimation processor 115 may divide the $SSM_{noise}$ estimate by 2 to address the power being equal to the sum of each variable. Thus, the SINR estimation processor 115 may multiply the SSM by 8/(6*2). Thus, the SINR estimation processor 115 may calculate the $SSM_{noise}$ using equation 4 shown below:

$$SSM_{noise} = \frac{8}{6*2} SSM(FGFS[f_1, g_1, h_1, c_1, d_1, e_1] - SGFS[f_2, g_2, h_2, c_2, d_2, e_2]) \qquad (4)$$

Other calculation windows, such as FGFS[$g_1$, $h_1$, $c_1$, $d_1$,] and SGFS[$g_2$, $h_2$, $c_2$, $d_2$] may be used to determine the $SSM_{noise}$. This example with shorter windows may include less averaging but may be more consistent with an FFT-based approach to calculate SSMs.

Once the SINR estimation processor 115 estimates the $SSM_{noise}$, the SINR estimation processor 115 may estimate the $SSM_{signal}$ by subtracting the $SSM_{noise}$ from the $SSM_{total}$. The SINR estimation processor 115 may exclude any fragments of the LLTF with ISI. For example, the SINR estimation processor 115 may create and/or use an ISI Free Fragment Group (IFFG) of 5.6 microseconds: IFFG[$c_1$, $d_1$, $e_1$, $f_1$, $g_1$, $h_1$, $a_2$, $b_2$, $c_2$, $d_2$, $e_2$, $f_2$, $g_2$, $h_2$], create and/or use an IFFG of 3.2 microseconds: IFFG[$f_1$, $g_1$, $h_1$, $a_2$, $b_2$, $c_2$, $d_2$, $e_2$], or create and/or use an IFFG of some other window size that is a power of two multiples or submultiples of 3.2 microseconds to align with an FFT-based processing flow. SSM(IFFG) may be the SSM of the IFFG the SINR estimation processor 115 determines to use. Thus, the SINR estimation processor 115 may calculate the $SSM_{signal}$ using equation 5 shown below:

$$SSM_{signal} = SSM(IFFG) - SSM_{noise} \qquad (5)$$

Because the IFFG may be 5.6 microseconds and the length of the signal for $SSM_{noise}$ may be 3.2 microseconds, the SSM(IFFG) may be multiplied by 3.2/5.6 in equation 5 to scale the SSM(IFFG) to the $SSM_{noise}$. Next, the SINR estimation processor 115 may determine the $SSM_{ISI}$. Because noise may be present in every fragment, the SINR estimation processor 115 may calculate an SSM with noise and ISI ($SSM_{noise+ISI}$) and subtract the $SSM_{noise}$ from the $SSM_{noise+ISI}$ to determine the $SSM_{ISI}$.

Figure 5:
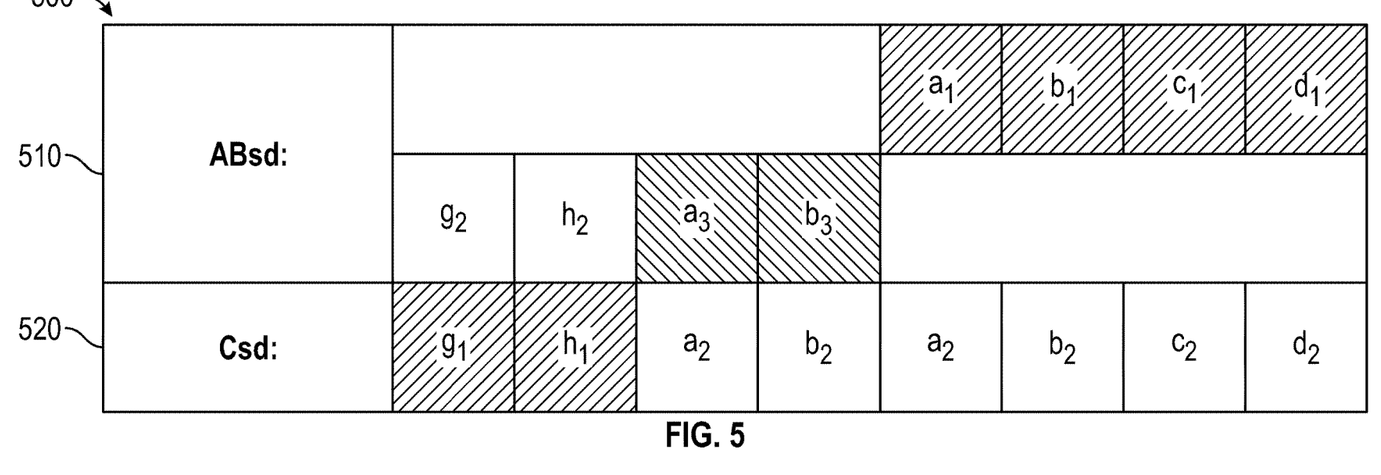
FIG. 5 is a chart of groups of fragmented LLTF symbols for estimating ISI power.

FIG. 5 is a chart 500 of groups of fragmented LLTF symbols for estimating Inter Symbol Interference (ISI) power. The chart 500 includes a first ISI estimation group 510 of fragments of the LLTF and a second ISI estimation group 520 of fragments of the LLTF. The first ISI estimation group 510 includes LLTF fragments $g_2$, $h_2$, $a_3$, $b_3$, $a_1$, $b_1$, $c_1$, and $d_1$ in that order, so the first ISI estimation group 510 may be represented as FIEG[$g_2$, $h_2$, $a_3$, $b_3$, $a_1$, $b_1$, $c_1$, $d_1$]. The second ISI estimation group 520 includes $g_1$, $h_1$, $a_2$, $b_2$, $a_2$, $b_2$, $c_2$, and $d_2$ in that order, so the second ISI estimation group 520 may be represented as SIEG[$g_1$, $h_1$, $a_2$, $b_2$, $a_2$, $b_2$, $c_2$, $d_2$]. The first ISI estimation group 510 minus the second ISI estimation group 520 may be equivalent to the sum of the signal and the noise minus the sum of the signal, the noise, the ISI at the beginning of the LLTF, and the ISI at the end of the LLTF. Thus, subtracting the second ISI estimation group 520 from the first ISI estimation group 510 may result in just the ISI remaining. The SINR estimation processor 115 may determine the $SSM_{noise+ISI}$ using equation 6 shown below:

$$SSM_{noise+ISI} = SSM( \qquad (6)$$

$FIEG[g_2, h_2, a_3, b_3, a_1, b_1, c_1, d_1] - SIEG[g_1, h_1, a_2, b_2, a_2, b_2, c_2, d_2])$

The $SSM_{noise+ISI}$ results in two units of $SSM_{noise}$, so the SINR estimation processor 115 may subtract two units of $SSM_{noise}$ from the $SSM_{noise+ISI}$ to calculate the $SSM_{ISI}$. Therefore, the SINR estimation processor 115 may calculate the $SSM_{ISI}$ using equation 7 shown below:

$$SSM_{ISI} = SSM_{noise+ISI} - 2*SSM_{noise} \qquad (7)$$

Once the SINR estimation processor 115 determines the $SSM_{signal}$ and the $SSM_{ISI}$, the SINR estimation processor 115 may estimate the SINR using equation 3. The SINR estimation processor 115 may determine the SINR using different amounts of ISI free samples. For example, when using more ISI free samples in the calculation (e.g., a 5.6 microsecond noise estimate), the SINR estimation processor 115 may use equation 8 shown below to determine the SINR:

$$SINR = \frac{K*SSM_{signal}}{K*SSM_{noise} + SSM_{ISI}} \qquad (8)$$

The $SSM_{signal}$, the $SSM_{noise}$, and/or the $SSM_{ISI}$ may be multiplied by ratios in equation 8 if the lengths of the signals used for the SSMs are different. For example, when calculating $SSM_{signal}$, the SSM(IFFG) in equation 5 may be multiplied by 8/14 when the signal used for the $SSM_{signal}$ is 5.6 microseconds.

Figure 6:
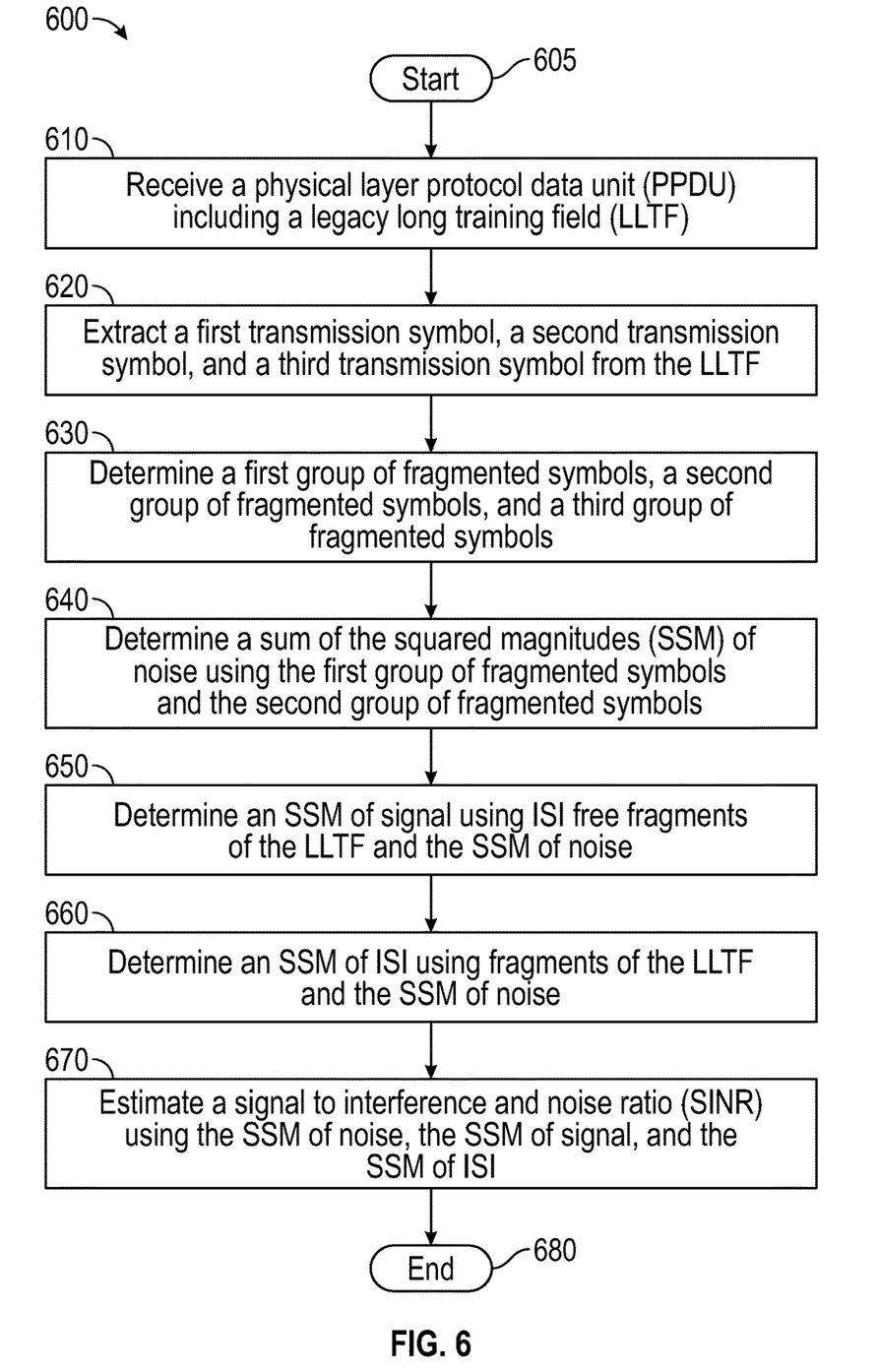
FIG. 6 is a flow chart of a method for estimating SINR.

In FIG. 6 is a flow chart of a method 600 for estimating SINR. The method 600 may begin at starting block 605 and proceed to operation 610. In operation 610, PPDU including a LLTF may be received. For example, the SINR estimation processor 115 receives the PPDU including the LLTF via the AP 104 receiving the PPDU from the STA 102 or the network core 106.

In operation 620, a first transmission symbol, a second transmission symbol, and a third transmission symbol from the LLTF may be extracted. For example, the SINR estimation processor 115 extracts the first transmission symbol, the second transmission symbol, and the third transmission symbol from the LLTF.

In operation 630, a first group of fragmented symbols, a second group of fragmented symbols, and a third group of fragmented symbols may be determined. For example, the SINR estimation processor 115 determines the first group of fragmented symbols, the second group of fragmented symbols, and the third group of fragmented symbols using the first transmission symbol, the second transmission symbol, and the third transmission symbol. The first group of fragmented symbols, the second group of fragmented symbols, and the third group of fragmented symbols include fragments of the LLTF. The SINR estimation processor 115 may shift the first group of fragmented symbols and the second group of fragmented symbols as described above.

In operation 640, an SSM of noise ($SSM_{noise}$) may be determined using the first group of fragmented symbols and the second group of fragmented symbols. For example, the SINR estimation processor 115 determines the $SSM_{noise}$ according to the methods and/or using the equations described above.

In operation 650, an SSM of signal ($SSM_{signal}$) may be determined using ISI free fragments of the LLTF and the SSM of noise. For example, the SINR estimation processor 115 determines the $SSM_{signal}$ according to the methods and/or using the equations described above.

In operation 660, an SSM of ISI may be determined using fragments of the LLTF and the SSM of noise. For example, the SINR estimation processor 115 determines the $SSM_{ISI}$ according to the methods and/or using the equations described above.

In operation 670, a SINR may be estimated using the SSM of noise, the SSM of signal, and the SSM of ISI. For example, the SINR estimation processor 115 estimates the SINR according to the methods and/or using the equations described above. The SINR estimation may also include the ratio of time windows, K. For example, the SSM of noise and the SSM of signal may be multiplied by K as shown in equation 9. The method 600 may conclude at ending block 680.

Figure 7:
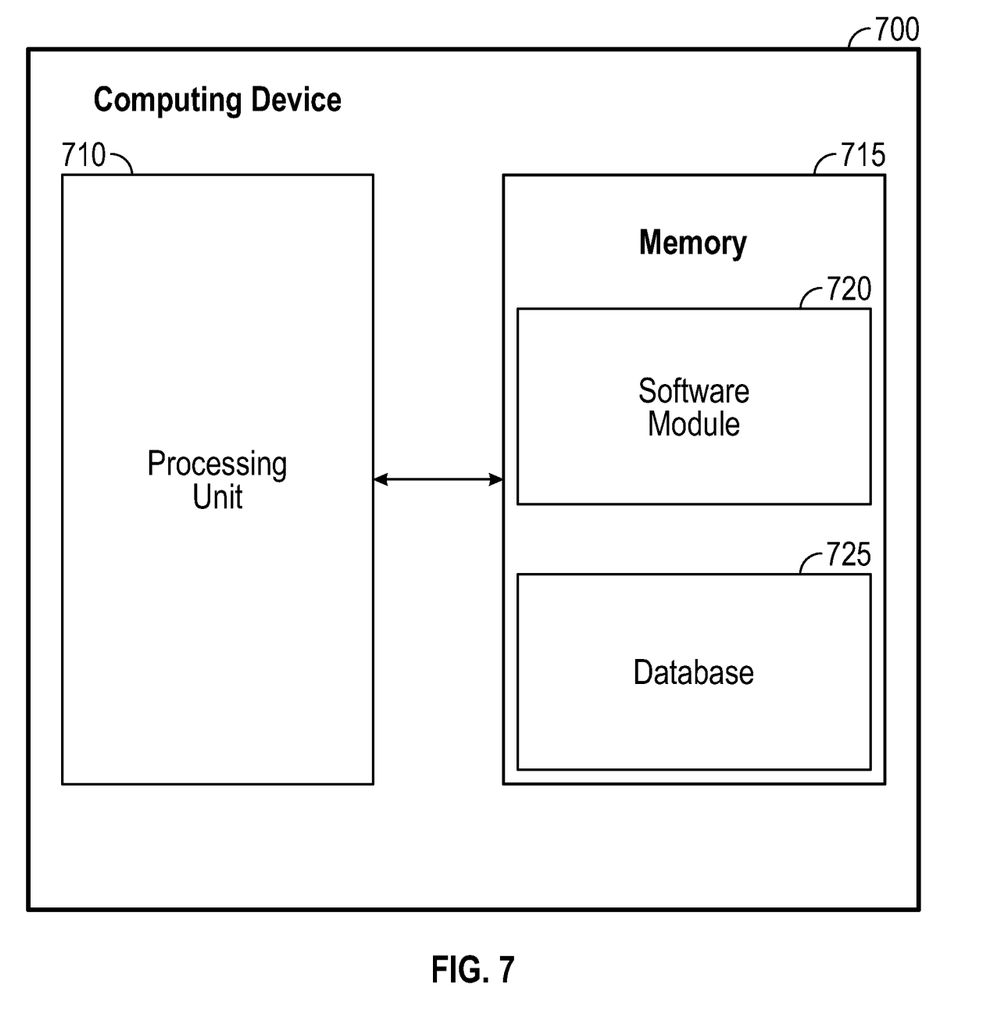
FIG. 7 is a block diagram of a computing device.

FIG. 7 is a block diagram of a computing device 700. As shown in FIG. 7, computing device 700 may include a processing unit 710 and a memory unit 715. Memory unit 715 may include a software module 720 and a database 725. While executing on processing unit 710, software module 720 may perform, for example, processes for providing SINR estimation with respect to FIG. 1, FIG. 2, FIG. 3, FIG. 4, FIG. 5, and FIG. 6. Computing device 700, for example, may provide an operating environment for the STA 102, the AP 104, the network core 106, the base band signal processing system 110, the SINR estimation processor 115, the networking system 120, the host system 122, and the MAC hub system 124 and/or any other system described herein. The STA 102, the AP 104, the network core 106, the base band signal processing system 110, the SINR estimation processor 115, the networking system 120, the host system 122, and the MAC hub system 124 and/or any other system described herein may operate in other environments and are not limited to computing device 700.

Computing device 700 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples, and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   receiving a Physical Layer Protocol Data Unit including a Legacy Long Training Field (LLTF);
   extracting a first transmission symbol, a second transmission symbol, and a third transmission symbol from the LLTF;
   determining a first group of fragmented symbols, a second group of fragmented symbols, and a third group of fragmented symbols using the first transmission symbol, the second transmission symbol, and the third transmission symbol, wherein the first group of fragmented symbols, the second group of fragmented symbols, and the third group of fragmented symbols include fragments of the LLTF;
   determining a Sum of Squared Magnitudes (SSM) of noise using the first group of fragmented symbols and the second group of fragmented symbols;
   determining an SSM of signal using Inter Symbol Interference (ISI) free fragments of the LLTF and the SSM of noise;
   determining an SSM of ISI using fragments of the LLTF and the SSM of noise; and
   estimating a Signal to Interference and Noise Ratio (SINR) using the SSM of noise, the SSM of signal, and the SSM of ISI.

2. The method of claim 1, wherein determining the first group of fragmented symbols, the second group of fragmented symbols, and the third group of fragmented symbols comprises:
   determining fragments of the LLTF in the first transmission symbol, the second transmission symbol, and the third transmission symbol;
   determining the first group of fragmented symbols using fragments of the LLTF in the first transmission symbol;
   determining the second group of fragmented symbols using fragments of the LLTF in the second transmission symbol; and
   determining the third group of fragmented symbols using fragments of the LLTF in the third transmission symbol.

3. The method of claim 2, wherein determining the first group of fragmented symbols, the second group of fragmented symbols, and the third group of fragmented symbols further comprises:
   shifting the first transmission symbol to determine a first order for the first group of fragmented symbols; and
   shifting the second transmission symbol to determine a second order for the second group of fragmented symbols.

4. The method of claim 1, wherein determining the SSM of noise comprises:
   excluding portions of the first group of fragmented symbols and the second group of fragmented symbols that include ISI; and
   determining an SSM of the first group of fragmented symbols with ISI portion excluded minus the second group of fragmented symbols with ISI portion excluded.

5. The method of claim 1, wherein determining the SSM of signal includes:
   determining ISI free fragments of the LLTF;
   determining an SSM of total using the ISI free fragments; and
   subtracting the SSM of noise from the SSM of the total.

6. The method of claim 1, wherein determining the SSM of ISI includes:
   determining a first ISI estimation group and a second ISI estimation group of fragments of the LLTF;
   determining an SSM of noise and ISI by calculating an SSM of the first ISI estimation group minus the second ISI estimation group; and
   subtracting the SSM of noise from the SSM of noise and ISI.

7. The method of claim 1, wherein estimating the SINR includes determining a ratio of time windows.

8. A system comprising:
   a memory storage; and
   a processing unit coupled to the memory storage, wherein the processing unit is operative to:
      receiving a Physical Layer Protocol Data Unit including a Legacy Long Training Field (LLTF);
      extract a first transmission symbol, a second transmission symbol, and a third transmission symbol from the LLTF;
      determine a first group of fragmented symbols, a second group of fragmented symbols, and a third group of fragmented symbols using the first transmission symbol, the second transmission symbol, and the third transmission symbol, wherein the first group of fragmented symbols, the second group of fragmented symbols, and the third group of fragmented symbols include fragments of the LLTF;
      determine a Sum of Squared Magnitudes (SSM) of noise using the first group of fragmented symbols and the second group of fragmented symbols;
      determine an SSM of signal using Inter Symbol Interference (ISI) free fragments of the LLTF and the SSM of noise;
      determine an SSM of ISI using fragments of the LLTF and the SSM of noise; and
      estimate a Signal to Interference and Noise Ratio (SINR) using the SSM of noise, the SSM of signal, and the SSM of ISI.

9. The system of claim 8, wherein the processing unit being operative to determine the first group of fragmented symbols, the second group of fragmented symbols, and the third group of fragmented symbols comprises the processing unit being operative to:
   determine fragments of the LLTF in the first transmission symbol, the second transmission symbol, and the third transmission symbol;
   determine the first group of fragmented symbols using fragments of the LLTF in the first transmission symbol;
   determine the second group of fragmented symbols using fragments of the LLTF in the second transmission symbol; and
   determine the third group of fragmented symbols using fragments of the LLTF in the third transmission symbol.

10. The system of claim 9, wherein the processing unit being operative to determine the first group of fragmented symbols, the second group of fragmented symbols, and the third group of fragmented symbols further comprises the processing unit being operative to:
    shift the first transmission symbol to determine a first order for the first group of fragmented symbols; and
    shift the second transmission symbol to determine a second order for the second group of fragmented symbols.

11. The system of claim 8, wherein the processing unit being operative to determine the SSM of noise comprises the processing unit being operative to:
   exclude portions of the first group of fragmented symbols and the second group of fragmented symbols that include ISI; and
   determine an SSM of the first group of fragmented symbols with ISI portion excluded minus the second group of fragmented symbols with ISI portion excluded.

12. The system of claim 8, wherein the processing unit being operative to determine the SSM of signal comprises the processing unit being operative to:
   determine ISI free fragments of the LLTF;
   determine an SSM of a total using the ISI free fragments; and
   subtract the SSM of noise from the SSM of the total.

13. The system of claim 8, wherein the processing unit being operative to determine the SSM of ISI comprises to:
   determine a first ISI estimation group and a second ISI estimation group of fragments of the LLTF;
   determine an SSM of noise and ISI by calculating an SSM of the first ISI estimation group minus the second ISI estimation group; and
   subtract the SSM of noise from the SSM of noise and ISI.

14. The system of claim 8, wherein the processing unit being operative to estimate the SINR comprises the processing unit being operative to determine a ratio of time windows.

15. A non-transitory computer-readable medium that stores a set of instructions which when executed perform a method executed by the set of instructions comprising:
   receiving a Physical Layer Protocol Data Unit including a Legacy Long Training Field (LLTF);
   extracting a first transmission symbol, a second transmission symbol, and a third transmission symbol from the LLTF;
   determining a first group of fragmented symbols, a second group of fragmented symbols, and a third group of fragmented symbols using the first transmission symbol, the second transmission symbol, and the third transmission symbol, wherein the first group of fragmented symbols, the second group of fragmented symbols, and the third group of fragmented symbols include fragments of the LLTF;
   determining a Sum of Squared Magnitudes (SSM) of noise using the first group of fragmented symbols and the second group of fragmented symbols;
   determining an SSM of signal using Inter Symbol Interference (ISI) free fragments of the LLTF and the SSM of noise;
   determining an SSM of ISI using fragments of the LLTF and the SSM of noise; and
   estimating a Signal to Interference and Noise Ratio (SINR) using the SSM of noise, the SSM of signal, and the SSM of ISI.

16. The non-transitory computer-readable medium of claim 15, wherein determining the first group of fragmented symbols, the second group of fragmented symbols, and the third group of fragmented symbols comprises:
   determining fragments of the LLTF in the first transmission symbol, the second transmission symbol, and the third transmission symbol;
   determining the first group of fragmented symbols using fragments of the LLTF in the first transmission symbol;
   determining the second group of fragmented symbols using fragments of the LLTF in the second transmission symbol; and
   determining the third group of fragmented symbols using fragments of the LLTF in the third transmission symbol.

17. The non-transitory computer-readable medium of claim 16, wherein determining the first group of fragmented symbols, the second group of fragmented symbols, and the third group of fragmented symbols further comprises:
   shifting the first transmission symbol to determine a first order for the first group of fragmented symbols; and
   shifting the second transmission symbol to determine a second order for the second group of fragmented symbols.

18. The non-transitory computer-readable medium of claim 15, wherein determining the SSM of noise comprises:
   excluding portions of the first group of fragmented symbols and the second group of fragmented symbols that include ISI; and
   determining an SSM of the first group of fragmented symbols with ISI portion excluded minus the second group of fragmented symbols with ISI portion excluded.

19. The non-transitory computer-readable medium of claim 15, wherein determining the SSM of signal comprises:
   determining ISI free fragments of the LLTF;
   determining an SSM of a total using the ISI free fragments; and
   subtracting the SSM of noise from the SSM of the total.

20. The non-transitory computer-readable medium of claim 15, wherein determining the SSM of ISI comprises:
   determining a first ISI estimation group and a second ISI estimation group of fragments of the LLTF;
   determining an SSM of noise and ISI by calculating an SSM of the first ISI estimation group minus the second ISI estimation group; and
   subtracting the SSM of noise from the SSM of noise and ISI.

* * * * *